US010853395B2

(12) United States Patent
Sakhuja et al.

(10) Patent No.: US 10,853,395 B2
(45) Date of Patent: Dec. 1, 2020

(54) EXTRACTION OF KEYWORDS FOR GENERATING MULTIPLE SEARCH QUERIES

(71) Applicant: salesforce.com, inc., San Francisco, CA (US)

(72) Inventors: Aditya Sakhuja, San Francisco, CA (US); Pingping Xiu, San Francisco, CA (US); Weiping Peng, San Francisco, CA (US); Edgar Gerardo Velasco, San Francisco, CA (US); Anjan Goswami, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 249 days.

(21) Appl. No.: 16/140,443

(22) Filed: Sep. 24, 2018

(65) Prior Publication Data

US 2020/0097600 A1 Mar. 26, 2020

(51) Int. Cl.
*G06F 16/33* (2019.01)
*G06F 16/338* (2019.01)
*G06F 16/35* (2019.01)

(52) U.S. Cl.
CPC ........ *G06F 16/3334* (2019.01); *G06F 16/338* (2019.01); *G06F 16/353* (2019.01)

(58) Field of Classification Search
CPC ... G06F 16/3334; G06F 16/353; G06F 16/338
See application file for complete search history.

(56) References Cited

U.S. PATENT DOCUMENTS

| 7,730,478 | B2 | 6/2010 | Weissman |
| 7,779,039 | B2 | 8/2010 | Weissman et al. |
| 8,793,120 | B1 | 7/2014 | Fliedner et al. |
| 9,529,488 | B2 | 12/2016 | Beechuk et al. |
| 2011/0119128 | A1 | 5/2011 | Fang et al. |
| 2012/0128239 | A1 | 5/2012 | Goswami et al. |
| 2012/0221557 | A1 | 8/2012 | Edmonds et al. |
| 2012/0303615 | A1 | 11/2012 | Goswami et al. |
| 2014/0282100 | A1 | 9/2014 | Beechuk et al. |
| 2016/0104067 | A1 | 4/2016 | Xu et al. |

(Continued)

FOREIGN PATENT DOCUMENTS

WO WO2014144796 A1 9/2014

*Primary Examiner* — Loc Tran
(74) *Attorney, Agent, or Firm* — Haynes and Boone, LLP

(57) ABSTRACT

A method is provided for providing a final result set to a user. In some embodiments, the method includes receiving from the user an input question directed to an organization belonging to a particular category. The method includes applying a plurality of rules to the input question, at least one rule being assigned a weight dependent on the particular category to which the organization belongs. The method further includes extracting, based on applying the plurality of rules, multiple collections of keywords and generating a plurality of search queries. Each search query includes a different collection of keywords. The method also includes submitting the plurality of search queries to a database and in response, receiving multiple result sets from the database. The method further includes in response to the input question, providing a final result including a subset of documents included in the multiple result sets to the user.

18 Claims, 8 Drawing Sheets

(56) References Cited

U.S. PATENT DOCUMENTS

| | | |
|---|---|---|
| 2016/0239563 A1* | 8/2016 | Fontaine ............... G06F 16/285 |
| 2016/0267361 A1 | 9/2016 | Xiu |
| 2017/0068646 A1 | 3/2017 | Beechuk et al. |
| 2017/0083569 A1* | 3/2017 | Boguraev ............. G06F 16/243 |
| 2017/0193573 A1 | 7/2017 | Han et al. |
| 2018/0011851 A1 | 1/2018 | Xiu et al. |
| 2018/0260579 A1 | 9/2018 | Bose et al. |
| 2018/0293241 A1 | 10/2018 | Chittar et al. |
| 2019/0095054 A1 | 3/2019 | Peng et al. |
| 2019/0138660 A1 | 5/2019 | White et al. |

* cited by examiner

EXTRACTION OF KEYWORDS FOR GENERATING MULTIPLE SEARCH QUERIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to computing device, and more specifically to systems and methods for extracting keywords from a text input and generating multiple search queries including one or more of the keywords from the input text input.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

Figure 1:
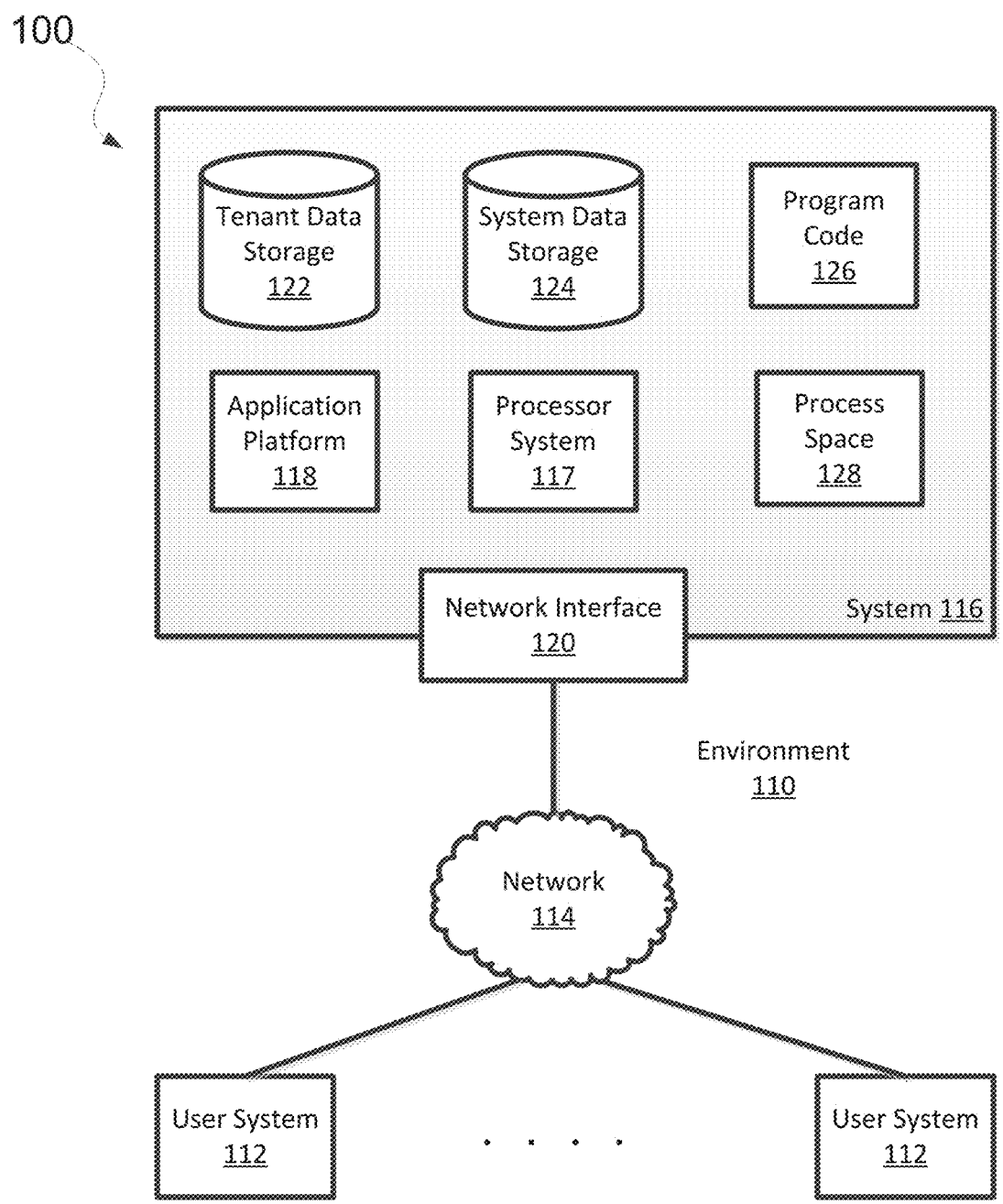
FIG. 1 illustrates a block diagram of an example environment according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

EXAMPLE ENVIRONMENT

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object.

However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, personal digital assistant (PDA), cellphone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
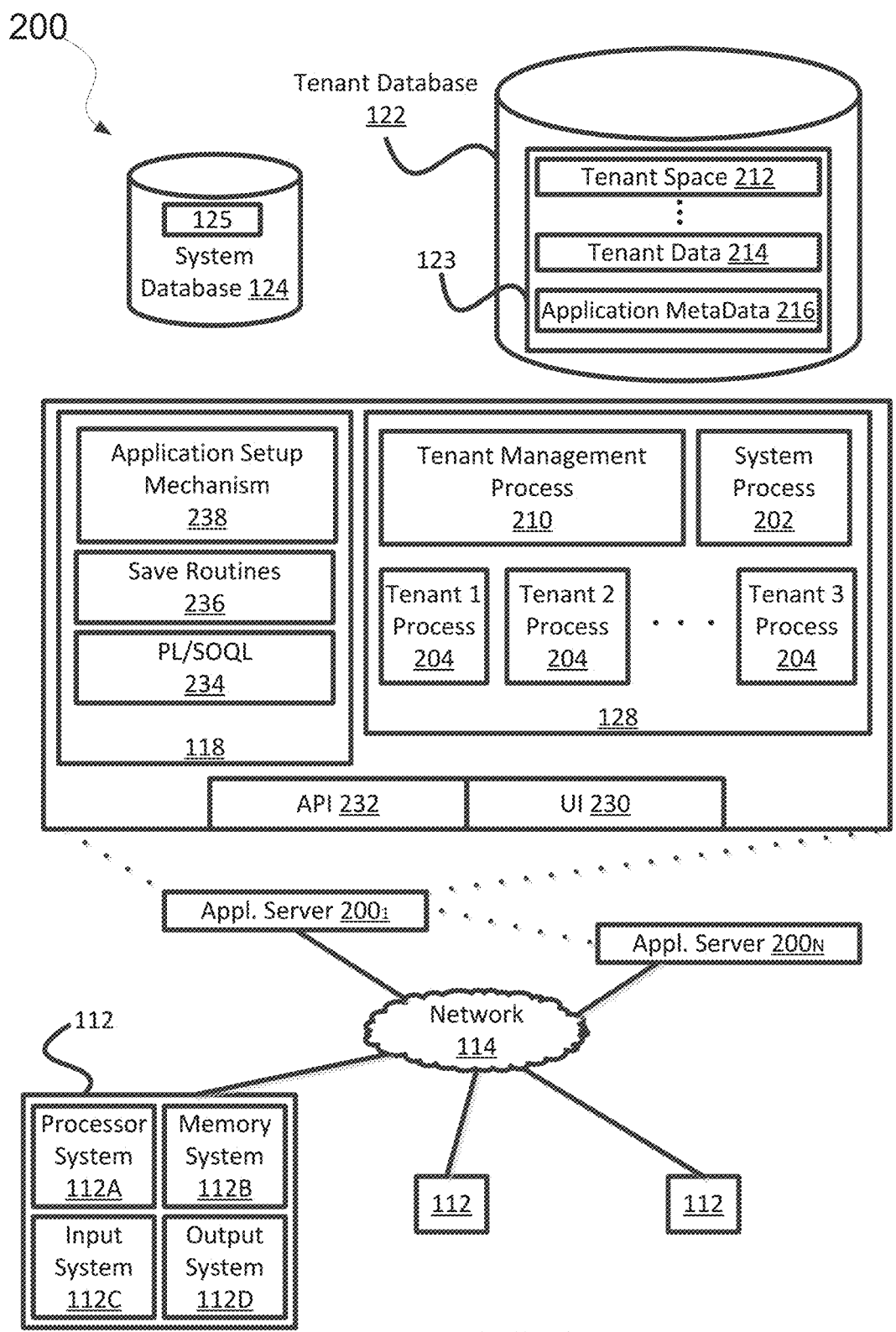
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed September, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Multiple Search Queries Based on an Input Question

Various users interacting with a system, such as a customer relationship management (CRM) system, may have questions for which they need help or a response. Organizations subscribe to the CRM system, which classifies an organization as belonging to a particular category (e.g., service-oriented category, products/knowledge-based category, etc.). A CRM system, such as the multi-tenant database system 116 described above, may collect data about organizations such as their product offerings, store locations, contact information, employees, policies (e.g., return or refund policies), among other information.

A user may submit an input question including text, and the data stored in the CRM system may be leveraged to assist in extracting, using a plurality of rules, keywords from the input question. The term "user" may refer to an entity asking the question. The term "organization" may refer to an entity to which the question is being directed and may subscribe to the CRM system. An organization may also be referred to as a business or a company. To optimize or enhance each user's experience with the database system, it may be desirable or preferable that the database system provide information most relevant to that user based on a category to which the organization belongs and the question posed by the user.

In an example, a user directs a text input question to the organization (e.g., via a Website or Intranet), which uses the CRM system for retrieving an answer to the user's question. In order to successfully answer the user's question, the CRM system applies rules to the question in order to identify independent collections of keywords from the question. The CRM system identifies the independent collections of keywords as being useful in answering the user's question, and the rules are assigned a weight based on the organization's category. The independent collections of keywords may include a first collection of keywords, a second collection of keywords, and so on, with each collection of keywords being different from each other. A rule that is applied to an input question directed to an organization belonging to a first category may have the same weight when applied to other organizations belonging to the first category. If the same rule is applied to an input question directed to an organization belonging to a second category different from the first category, the weight applied in this example may be different from when applied to organizations belonging to the first category.

The CRM system may generate different search queries and submit them to a search database, where each search query includes one collection of keywords from the independent collections of keywords. Accordingly, two different search queries may be generated from the same question, and their submission to a database may return different result sets. The search database may include one or more data sets, and a result set may include one or more documents. Search queries may be submitted to the search database until a target number of documents is received.

As discussed in the present disclosure, the application of a rule to the input question may trigger a complete cycle of extracting a collection of keywords based on the input question, generating a search query including the collection of keywords, submitting the search query including the collection of keywords to the search database, and receiving a result set in response to the submitted search query. A search of the CRM system may accordingly limit computations and provide better scalability and answer quality in the situation where numerous questions are posed by users. Aspects of the disclosure may provide benefits such as reducing the mean time for resolving an input question and improving question/answer resolution quality.

Figure 3:
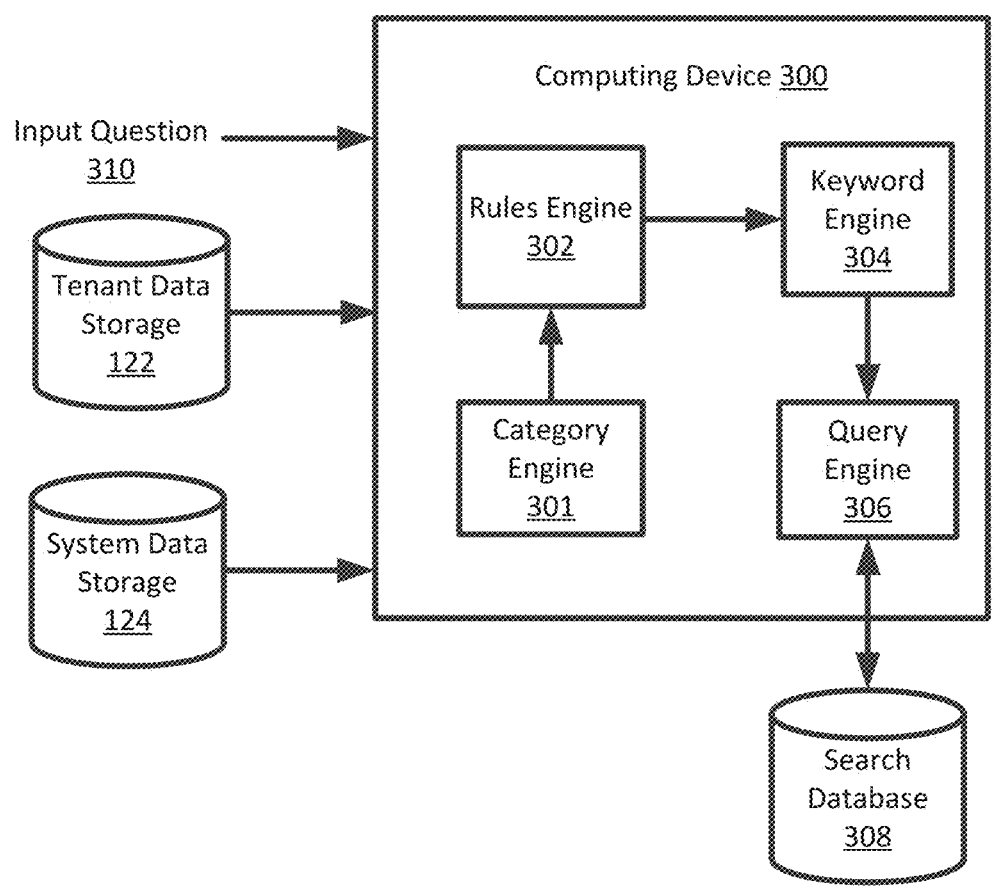
FIG. 3 illustrates a computing device for providing multiple query result sets to a user according to some embodiments.

FIG. 3 illustrates a computing device 300 for providing multiple query result sets to a user according to some embodiments according to some embodiments. In FIG. 3, computing device 300 includes a category engine 301, rules engine 302, a keyword engine 304, and a query engine 306. A user may desire an answer to a question, which may be referred to herein as an input question 310 that includes text input from a user. Input question 310 may include a title and/or a body including text input. The user may direct the input question 310 to a particular organization. In an example, the user directs the input question 310 to an organization by, for example, entering the input question 310 into a search box on the organization's Website. In another example, the user is an employee of the organization and enters the input question 310 into the organization's document management system. The tenant data storage 122 and/or the system data 125 may be used to serve user requests.

Organizations may subscribe to the CRM system, such as the multi-tenant database system 116 described above. The category engine 301 classifies an organization as belonging to a particular category (e.g., service-oriented category, products/knowledge-based category, etc.). The rules engine 302 stores rules that may be applied to an input question. The rules engine 302 takes as data input the input question 310 and data (e.g., the rules) stored in a database (e.g., tenant data storage 122 and/or system data storage 124). Rules engine 302 identifies, based on a first category to which a first organization belongs, a first plurality of rules that should be applied to a first input question and identifies, based on a second category to which a second organization belongs, a second plurality of rules that should be applied to the first input question or a second input question. The first plurality of rules may be different from the second plurality of rules. Additionally, if an input question is directed to two different organizations belonging to the same category, the same rules (and weights) may be applied to the input question. At least one rule of the plurality of rules is assigned a weight dependent on a category to which the organization belongs. A weight may also be referred to as a priority. The priority or weight of particular rules guides the keyword engine 304 to extract important keywords given the context of the input question 310 and/or the organization's category. The assigned weight based on a particular category recognizes that some terms (e.g., verbs or nouns) are more important for some organizations belonging to one category than another category.

The rules may be custom-ranked keyword extraction rules for different organizations with the goal of achieving useful result sets. The custom-ranked keyword extraction rules may be ranked using a logistic regression machine learning model that provides probabilistic coefficients for every rule that acts as features to the machine learning model. The machine learning model may be trained on data stored in the tenant data storage 122 and/or the system data 125. In an example, the machine learning model is trained on enterprise articles associated with an organization or user feedback regarding the quality of a document returned in a result set. User feedback may include expressions from users expressing their satisfaction or dissatisfaction with a document being returned in a result set, an indication that the user "likes" the document, an indication that the user shared the document with another user, etc.

The rules engine 302 sends the plurality of rules and their associated weights to the keyword engine 304. As discussed, the priority or weight of particular rules guides the keyword engine 304 to extract important keywords given the context of the input question 310 and/or the organization's category. The keyword engine 304 applies the plurality of rules to identify important keywords so that not every word used in the input question 310 is represented. In an example, the keyword engine 304 applies the rules in an order based on their assigned weight or priority. For example, a first rule having a greater weight or higher priority is applied to the input question 310 before a second rule having a lower weight or lower priority than the first rule.

Keyword engine 304 may use NLP techniques to extract the keywords. The keyword engine 304 applies the plurality of rules (e.g., using natural language processing (NLP)) to the input question 310 and extracts, based on applying the plurality of rules, multiple collections of keywords. Each rule may trigger the extraction of a collection of keywords. The keyword engine 304 provides the multiple collections of keywords to the query engine 306. The query engine 306 generates a plurality of search queries, where each search query of the plurality of search queries includes a different collection of keywords from the multiple collections of keywords. The query engine 306 submits one or more of the plurality of search queries to a search database 308, which includes one or more datasets. In some examples, a portion of the data stored in the search database 308 is stored in the tenant data storage 122 and/or system data storage 124.

The search database 308 may be queried multiple times based on the same input question 310, but the application of different rules may cause different keywords to be extracted and thus different search queries to be generated and submitted to the search database 308. In response to each search query received from the query engine 306, the search database 308 sends a result set to the query engine 306. Accordingly, query engine 306 may receive multiple result sets from the search database 308 in response to the one or more submitted search queries. A result set may include one or more documents. A document may be any item that is stored in the search database 308 and returned in response to a search query. For example, an item may be a document in portable document format (PDF), a sequence of steps, a video file, an image file, etc. Additionally, in response to the input question 310, query engine 306 provides one or more documents returned in the multiple result sets to the user.

Figure 4:
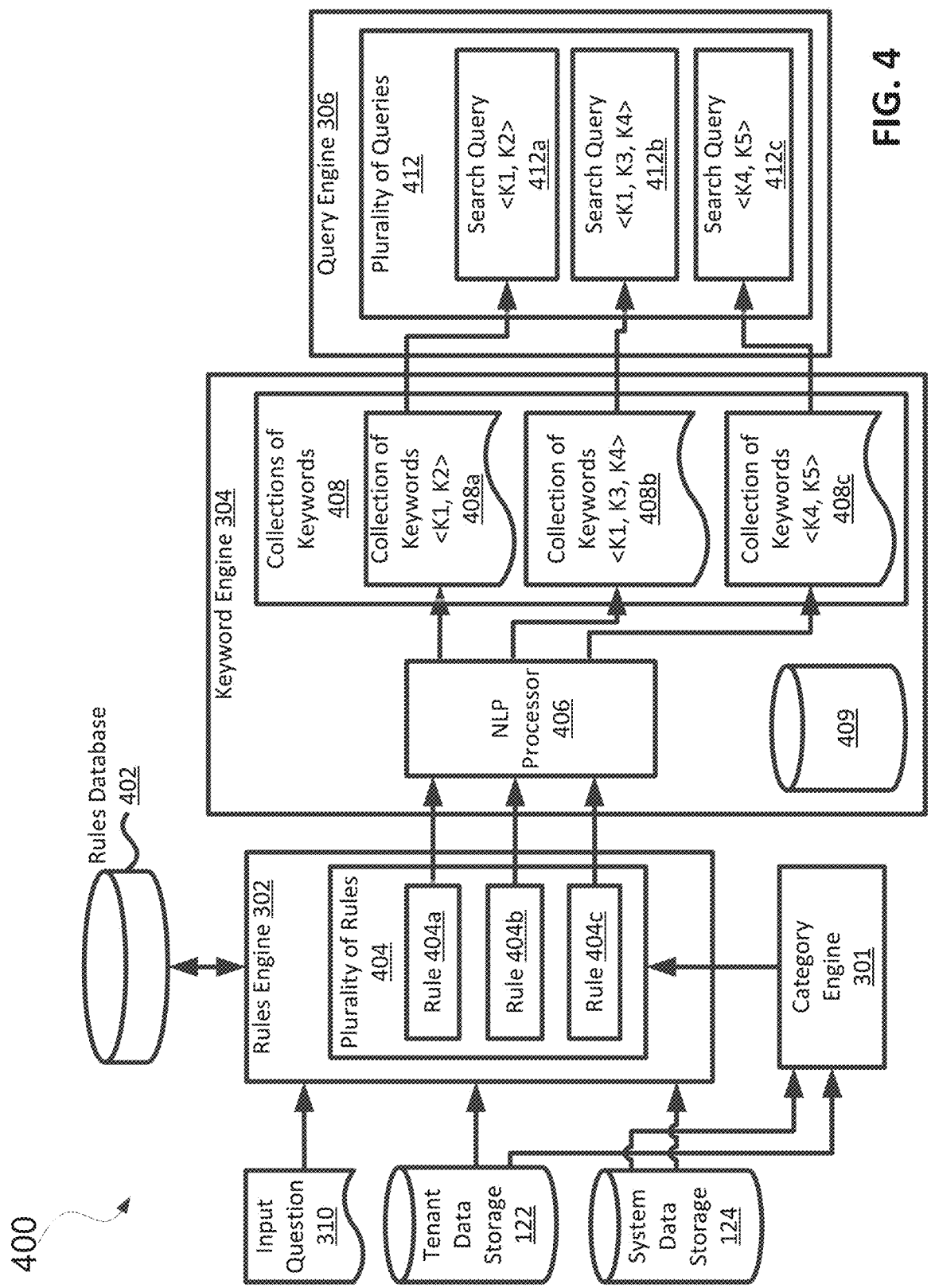
FIG. 4 illustrates a diagram of a process flow for generating multiple search queries based on applying a plurality of rules to a single input question according to some embodiments according to some embodiments.

FIG. 4 illustrates a diagram 400 of a process flow for generating multiple search queries based on applying a plurality of rules to a single input question according to some embodiments. In the example illustrated in FIG. 4, the category engine 301 classifies each organization of a plurality of organizations as belonging to a particular category of a plurality of categories. In an example, the category engine 301 maintains category identifiers (IDs) and assigns an organization a category ID that identifies the organization as belonging to a particular category. Different organizations may have different characteristics. In an example, a first organization offers cable services and accordingly may be considered a service-oriented organization, and a second organization sells baked goods and accordingly may be considered a product-oriented organization. Words in the input question 310 that are verbs or indicate action (e.g., "How do I . . . " or "Where can I . . . ") may be assigned a higher priority or heavier weight for service-oriented organizations than product-oriented organizations. Additionally, words in the input question 310 that are noun phrases or product names may be assigned a higher priority or heavier weight for product-oriented organizations than service-oriented organizations. A user posing a question directed to a product-oriented organization typically wants information on offered products without asking how to perform actions (e.g., resetting a modem).

The rules engine 302 takes the input question 310 and data stored in tenant data storage 122 and/or system data storage 124 as input and recognizes the organization to which the input question 310 is directed. In an example, the category engine 301 provides the category ID of an organization to the rules engine 302, which may then determine the category and thus the plurality of rules and their associated weights. The rules engine 302 accesses a rules database 402 storing rules that may be applied to one or more input questions. Different rules may be retrieved based on the category to which the organization belongs. In an example, the rules engine 302 retrieves, based on a category to which an organization belongs, a plurality of rules 404 from the rules database 402.

Rules stored in the rules database 402 may be logically grouped into strategies that can be invoked holistically. In an example, the input question 310 is directed to an organization belonging to a given category, a strategy includes the plurality of rules 404 and their associated weights, and rules engine 302 retrieves the strategy for any organizations belonging to the given category. The plurality of rules 402 includes a rule 404, a rule 404b, and a rule 404c. Each of the rules may be assigned a weight or a priority dependent on a category to which an organization belongs. In an example, the rule 404 is assigned a weight of 65, the rule 404b is assigned a weight of 75, and a rule 404c is assigned a weight of 85. In some examples, the higher the weight the lower the priority of the rule. In other examples, the lower the weight the lower the priority of the rule. In some examples, each organization has a domain, and certain domains have different rule applications. A weight may be based on the domain of an organization. Additionally, the retrieval of rules and/or the weights may be machine learned.

The keyword engine 304 includes an NLP processor 406 that applies the plurality of rules 404 to the input question 310. The NLP processor 406 may apply the plurality of rules 404 using NLP. Although the NLP processor 406 is illustrated as being incorporated in the keyword engine 304, it should be understood that the NLP processor 406 may be separate from the keyword engine 304 and/or may be incorporated in the rules engine 302. The NLP processor 406 may convert the input question 310 into a representation formed of keywords that have been identified as being important given the context of the input question 310 and organization to which the input question 310 is directed. The keyword engine 304 may use the NLP processor 406 to extract, based on applying the plurality of rules, multiple collections of keywords 408. A keyword may be common to multiple rules. For example, each rule may trigger a different set of keywords to be extracted, and the keywords in any two collections of keywords may overlap. For example, the multiple collections of keywords 408 include a collection of keywords <K1, K2> 408a, a collection of keywords <K1, K3, K4> 408b, and a collection of keywords <K4, K5> 408c.

In an example, the input question 310 directed to ACME Co. includes "My ACME router model M500 is broken. How do I return it?" In this example, the category engine 301 classifies ACME Co. as belonging to a service-oriented category, which is assigned category ID "0001." When a user directs the input question 310 to ACME Co., the rules engine 302 may retrieve those rules (e.g., the plurality of rules 404) that are applicable to organizations assigned the category ID "0001" along with their weights. In this example, the keyword engine 304 may apply the plurality of rules 404 to the input question 310 and extract, based on rule 404a, a first collection of keywords <K1="ACME Co.", K2="return">, extract, based on rule 404b, a second collection of keywords <K1="ACME Co.", K3="broken", K4="fix">, extract, based on rule 404c, and a third collection of keywords <K4="fix" and K5="router">. In an example, the first collection of keywords is extracted first because the rule 404a has a higher priority than the rule 404b and the rule 404b.

Additionally, the input question 310 may include a term or phrase that is important because it may be the name of an organization. The organization name may or may not be included in a dictionary. In an example, keyword engine 304 accesses one or more databases 409 for extracting organization names as keywords. In an example, the database 409 includes an organization name database storing the names of organizations (e.g., FLICKR®, APPLE®, ACME Co., etc.) that otherwise would not be extracted or recognized as referring to an organization if not for the use of the organization name database. Trademarks are the properties of their respective owners. In another example, the database 409 includes an acronym database that stores acronyms. Keyword engine 304 may access one or more databases 409 for looking up acronyms identified in the input question 310 and determine whether to extract the acronym as a keyword accordingly.

In an example, the keyword engine 304 generates a vector representing an intent of the input question 310. The keyword engine 304 determines an intent of the user based on the input question 310. For example, the keyword engine 304 may determine that the intent of the user is to return an object (e.g., router) or to fix an object. The keyword engine 304 may infer intent by analyzing text from the input question 310, the category to which the organization belongs, and/or training a model to extract words or phrases that represent the inferred intent. The extracted features may be included in a feature vector for comparison with other objects. A feature may be extracted using a variety of techniques such as NLP. In an example, the keyword engine 304 uses a classification technique that uses existing training data for determining the intent in a supervised or semi-supervised classification.

In another example, the keyword engine 304 performs word embedding and/or character embedding to generate an embedding for each word and/or character in a text input sequence. Each text input includes a sequence of words, and each embedding can be a vector. In some embodiments, these can be word embeddings, such as obtained, for example, by running methods like word2vec, FastText, or GloVe, each of which defines a way of learning word vectors with useful properties. In some embodiments, the embedding may include partial word embeddings related to portions of a word. For example, the word "where" includes portions "wh," "whe," "her," "ere," and "re." Partial word embeddings can help to enrich word vectors with subword information/FastText. In some embodiments, the embeddings may include character embeddings, e.g., from a social media website. In an example, the engine computes vector representations for each word/character in the case/document and averages it out. In another example, the engine uses neural networks to learn the embedding for a document.

The keyword engine 304 may receive the embeddings and generate encodings based on the embeddings. The keyword engine 304 may include an encoder that learns high-level features from the words of text input sequences, and generates encodings (e.g., vectors) which map the words in the text input sequence to a higher dimensional space. The encodings may encode the semantic relationship between words. In some embodiments, the encoder is implemented with a recurrent neural network (RNN). In some embodiments, the encoder can be implemented with one or more gated recurrent units (GRUs). Various types of encoders may be used, including for example, a bidirectional long-term short-term memory (Bi-LSTM) encoder. In an example, the engine generates a feature vector representing elements in the form of a floating point vector of k dimensions. If other structured fields for cases are available, they may also be obtained and converted into a feature vector. The engine may also use bag-of-words modeling or term frequency-inverse document frequency (TF-IDF) for feature extraction. In an example, the keyword engine 304 uses TF-IDF for giving importance to particular keywords.

The keyword engine 304 may send the collections of keywords 408 to the query engine 306 for processing. The query engine 306 receives the collections of keywords 408 and generates a plurality of search queries 412 including a search query 412a, a search query 412b, and a search query 412c. Each search query of the plurality of search queries includes a different collection of keywords from the multiple collections of keywords. In an example, the query engine 306 generates the search query 412a including the collection of keywords <K1, K2> 408a, the search query 412b including the collection of keywords <K1, K3, K4> 408b, and the search query 412c including the collection of keywords <K4, K5> 408c. Accordingly, each of the search queries is different relative to each other and includes a different collection of keywords from each other.

As an overview of FIG. 4, keyword engine 304 applies the rule 404a to the input question 310 to extract collection of keywords <K1, K2> 408a, which is included in the search query 412a. Additionally, keyword engine 304 applies the rule 404b to the input question 310 to extract collection of keywords <K1, K3, K4> 408b, which is included in the search query 412b, and applies the rule 404c to the input question 310 to extract collection of keywords <K4, K5> 408c, which is included in the search query 412c. The order in which the rules are applied may be based on weights assigned to the rules, where the weights are dependent on a category to which an organization to which the input question 310 is directed belongs.

Figure 5:
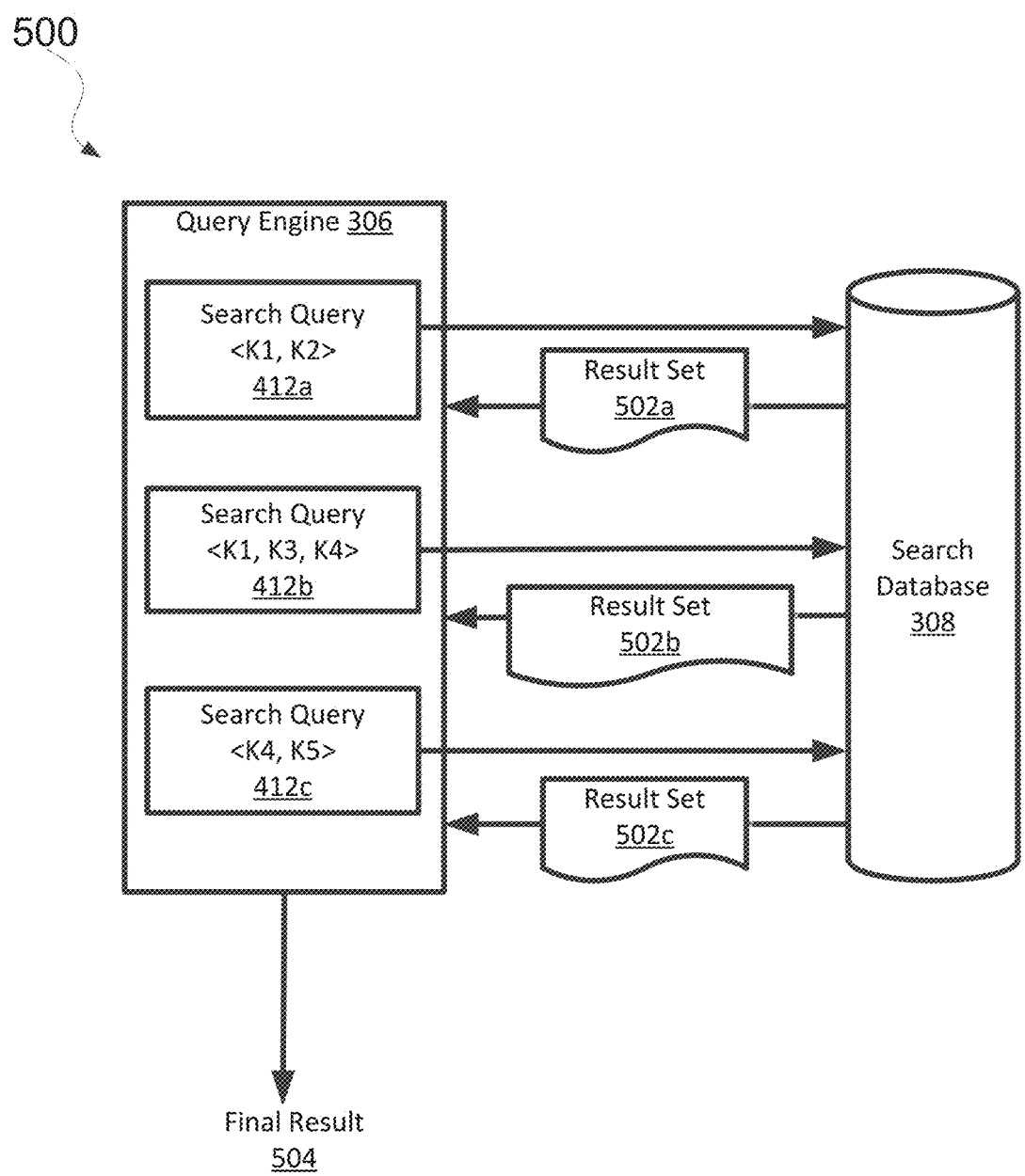
FIG. 5 illustrates a diagram of a process flow for providing a final result set to the user according to some embodiments.

FIG. 5 illustrates a diagram 500 of a process flow for providing a final result set to the user according to some embodiments. In the example illustrated in FIG. 5, the query engine 306 submits one or more search queries of the plurality of search queries 412 to the search database 308. In response to a search query, the search database 308 may return a result set of the search query to the query engine 306. Accordingly, the query engine 306 may receive multiple result sets 502a, 502b, and 502c in response to submitting the search query 412a, the search query 412b, and the search query 412c, respectively. In particular, the query engine 306 submits the search query 412a to the search database 308 and in response receives a result set 502a; submits the search query 412b to the search database 308 and in response receives a result set 502b; and/or submits the search query 412c to the search database 308 and in response receives a result set 502c.

Each result set may include one or more documents. In response to the input question 310, the query engine 306 may provide a final result set 504 to the user, where the final result set includes one or more documents from the result set 502a, the result set 502b, and/or the result set 502c. Each of the result set 502a, the result set 502b, and third result set 502c may return a different number of documents relative to each other. In keeping with the ACME Co. example provided above in which the keyword engine 304 generates the collections of keywords <K1="ACME Co.", K2="return">, <K1="ACME Co.", K2="broken", K3="fix">, and <K4="fix" and K5="router">, the result set 502a may include a knowledge article with information on how to return products to ACME Co. (e.g., return policies, etc.), the result set 502b may include a sequence of steps that the user may perform to fix or reset an ACME modem, and the result set 502c may include an ACME Co. contact number to call for technical support. The final result set returned to the user may include the knowledge article, the sequence of steps, and the contact number for technical support.

Although the query engine 306 calls the search database 308 several times, thus increasing the load on the search database 308, aspects provided in the disclosure may provide for cost savings. For example, by using aspects discussed herein, it may be unnecessary to invest in a new infrastructure (e.g., a new graph database) that is designed for answering questions. Additionally, the query engine 306 may perform actions to mitigate the work performed by the search database 308. In an example, the query engine 306 sets a maximum number of rules to apply to the input question 310. Each rule triggers a collection of keywords to be extracted, and the query engine 306 may generate a search query for each extracted collection of keywords. Accordingly, the number of search queries generated and submitted to the search database 308 may be capped at the number of rules applied to the input question 310.

In another example, the query engine 306 sets a maximum number of keywords for extraction per rule. Accordingly, a search query may have fewer items to search for in the search database 308. In another example, the query engine 306 sets a maximum number of documents to return in a result set and/or sets a maximum number of documents to return in the final result 504, which is sent to the user. A first rule having a greater weight or higher ranking is applied to the input question 310 before a second rule having a lower weight or lower ranking than the first rule. A collection of keywords based on the first rule may be generated and submitted in a first search query to the search database 308, and a first result set received based on the first search query. In an example, if the number of documents returned in the first result set exceeds the maximum number of documents that may be included in the final result set is received, it may be unnecessary to generate a second search query to submit to the database. If the number of documents returned in the first result set does not exceed the maximum number of documents that may be included in the final result set is received, the second search query may be submitted and the number of documents returned in response to this second search query determined. In this example, the query engine 306 may continue to generate and submit a search query until the maximum number of documents that may be included in the final result set is received. The query engine 306 may submit one or more search queries of the plurality of search queries to the database until a maximum number of documents that may be included in the final result set is received, where the one or more search queries of the plurality of search queries are submitted in an order based on a weight of the corresponding rule. A search query corresponds to a rule if the collection of keywords extracted based on applying the rule is included in the search query.

Additionally, the query engine 306 may submit one or more search queries sequentially or in parallel to the search database 308. In an example, an output of one rule may be an input into another rule, and thus the results are applied sequentially. In another example, rules that are independent of each other may be applied in parallel.

The search database 308 may include one or more answer sources. An answer source may refer to a logical repository within the search database 308. In an example, an answer source may index documents that are in different formats (e.g., execute documents, a manual, a sequence of steps, a PDF, videos, chat responses, etc.), and each of these formats may correspond to a different answer source relative to each other. Different answer sources may be intended for different purposes, and the query engine 306 may use the intent of the input question 310 to direct the search queries to particular answer sources. In an example, the query engine 306 maps, based on an intent of the question, the input question 310 to a plurality of answer sources.

Figure 6:
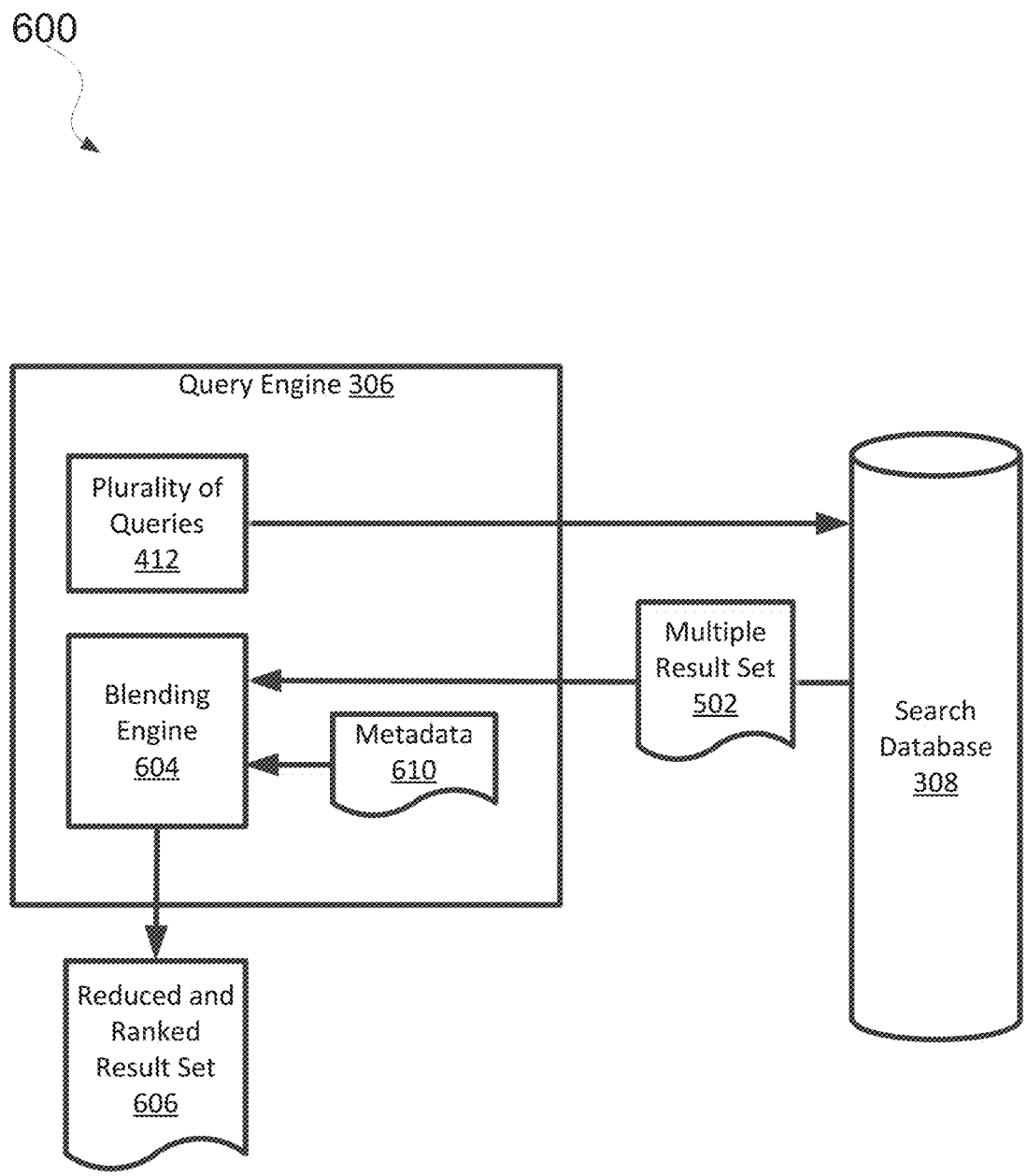
FIG. 6 illustrates a diagram of a process flow for modifying the multiple result sets according to some embodiments.

In some examples, it may be desirable for the query engine 306 to modify the multiple result sets returned by the search database 308. FIG. 6 illustrates a diagram 600 of a process flow for modifying the multiple result sets according to some embodiments. In the example illustrated in FIG. 6, the query engine 306 submits the plurality of queries 412 to the search database 308 and in response, receives the multiple result set 502. The multiple result set 502 may include the result set 502a, the result set 502b, and the result set 502c from the search database 308.

The query engine 306 includes a blending engine 604 that blends documents received in the multiple result set 502. A blending technique applied on the multiple result set 502 involves consideration of one or more signals for determining which documents to remove from the multiple result set 502 and/or a ranking for the documents. It may be desirable to remove documents from the multiple result set 502 because, for example, they are duplicates or because the number of documents included in the multiple result set 502 exceeds the maximum number of documents that may be returned in the final result to the user. After the blending engine 604 has blended the multiple result set 502, the blending engine 604 may provide a reduced and ranked result set 606, which includes a subset of the documents returned in the multiple result set 502.

In an example, the blending engine 604 identifies duplicate documents that are returned in the multiple result set 502 and removes the duplicate document from the multiple result set 502. In another example, the maximum number of documents that may be returned in the final result is 100, and multiple result set 502 includes 120 documents. The blending engine 604 may rank the documents and discard the 20 most bottom-ranked documents. The blending engine 604 may rank documents included in the multiple result set 502 based on an internal consumption of documents. In an example, the blending engine 604 uses metadata 610 that provides information about the documents. For example, the blending engine 604 may use a query independent ranking technique that ranks documents based on their general characteristics, which may be obtained from the metadata 610. In an example, blending engine 604 ranks one or more documents based on a last modified date of the document. A fresh document that has been updated recently may be assigned a heavier weight or a higher priority than a document that has not been updated as recently (e.g., two years). In another example, blending engine 604 ranks one or more documents based on a length of the document. For example, the more text a document has or the longer the document is, the more valuable the blending engine 604 may perceive the document as being. In this example, the blending engine 604 may assume that the document has a lot of useful information. The ranked and reduced result set 606 may be provided to a user or may be sent to another layer for further ranking of documents included in the result set 606 before transmission to the user.

Operational Flow

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Figure 7:
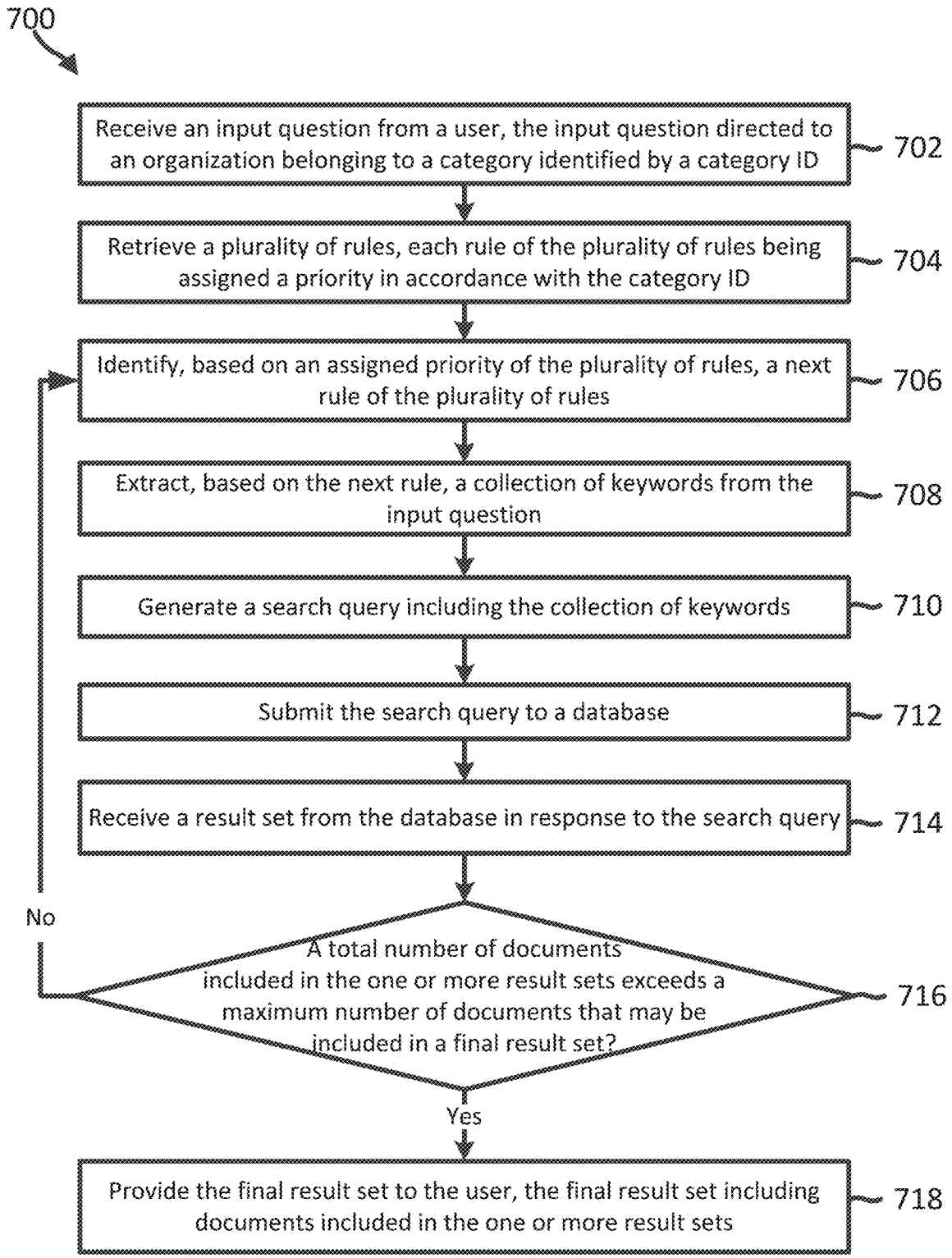
FIG. 7 is a flowchart of a method for providing a final result set based on multiple result sets according to some embodiments.

FIG. 7 is a flowchart of a method 700 for providing a final result set to a user according to some embodiments. One or more of the processes 702-718 of the method 700 may be implemented, at least in part, in the form of executable code stored on non-transitory, tangible, machine-readable media that when run by one or more processors may cause the one or more processors to perform one or more of the processes 702-718. In some embodiments, method 700 can be performed by one or more computing devices in systems or diagrams 100, 200, 300, 400, 500, and 600 of FIGS. 1, 2, 3, 4, 5, and 6, respectively, including the category engine 301, rules engine 302, keyword engine 304, query engine 306, and/or blending engine 604. Aspects of the processes 702-718 of method 700 have been covered in the description for FIGS. 1, 2, 3, 4, 5, and 6; and additional aspects are provided below.

At a process 702, a computing device (e.g., via rules engine 302) receives an input question from a user, the input question directed to an organization belonging to a category identified by a category ID. At a process 704, the computing device (e.g., via rules engine 302) retrieves a plurality of rules, each rule of the plurality of rules being assigned a priority in accordance with the category ID. At a process 706, the computing device (e.g., via rules engine 302) identifies, based on an assigned priority of the plurality of rules, a next rule of the plurality of rules. At a process 708, the computing device (e.g., via keyword engine 304) extracts, based on the next rule, a collection of keywords from the input question.

At a process 710, the computing device (e.g., via query engine 306) generates a search query including the collection of keywords. At a process 712, the computing device (e.g., via query engine 306) submits the search query to a database. At a process 714, the computing device (e.g., via query engine 306) receives a result set from the database in response to the search query. At a process 716, the computing device (e.g., via query engine 306) determines a total number of documents included in the one or more result sets exceeds a maximum number of documents that may be included in a final result set. If not, the process flow proceeds from the process 716 to process 706. If so, the process flow proceeds from the process 716 to process 718. At process 718, the computing device (e.g., via query engine 306) provides the final result set to the user, the final result set including documents included in the one or more result sets.

In some embodiments, one or more actions illustrated in processes 702-718 may be performed for any number of input questions received by the CRM system. It is also understood that additional processes may be performed before, during, or after processes 702-718 discussed above. It is also understood that one or more of the processes of method 700 described herein may be omitted, combined, or performed in a different sequence as desired.

Figure 8:
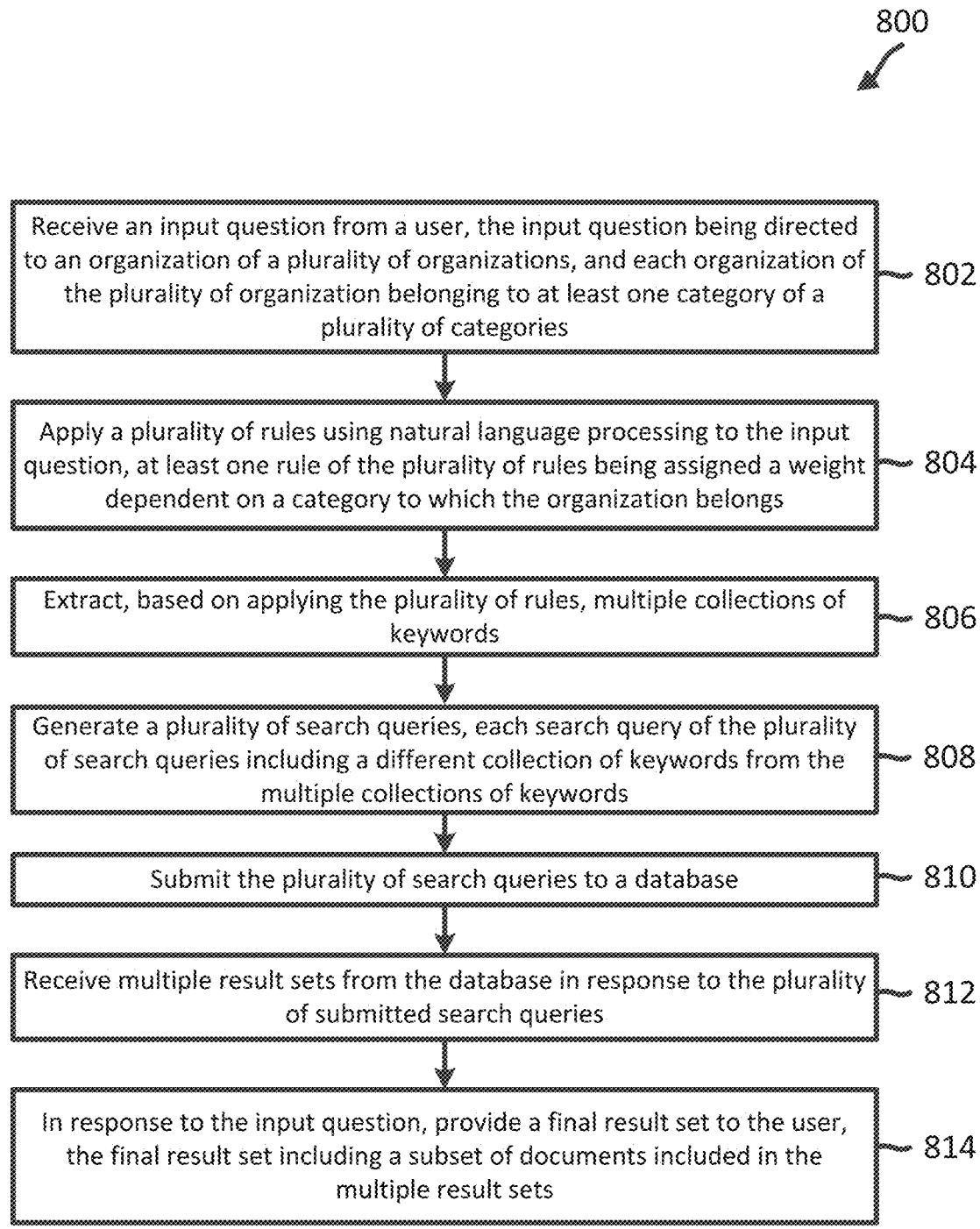
FIG. 8 is a flowchart of a method for providing a final result set based on multiple result sets according to some embodiments.

FIG. 8 is a flowchart of a method 800 for providing a final result set to a user according to some embodiments. One or more of the processes 802-814 of the method 800 may be implemented, at least in part, in the form of executable code stored on non-transitory, tangible, machine-readable media that when run by one or more processors may cause the one or more processors to perform one or more of the processes 802-814. In some embodiments, method 800 can be performed by one or more computing devices in systems or diagrams 100, 200, 300, 400, 500, and 600 of FIGS. 1, 2, 3, 4, 5, and 6, respectively, including the question engine 302, the candidate engine 304, the reputation engine 306, the matching engine 308, and/or the notification engine 716. Aspects of the processes 802-814 of method 800 have been covered in the description for FIGS. 1, 2, 3, 4, 5, and 6; and additional aspects are provided below.

At a process 802, a computing device (e.g., via rules engine 302) receives an input question from a user, the input question being directed to an organization of a plurality of organizations, and each organization of the plurality of organization belonging to at least one category of a plurality of categories. Various users interacting with a system, such as a CRM system, may have questions for which they need help or a response. At a process 804, the computing device (e.g., via keyword engine 304) applies a plurality of rules using natural language processing to the input question, at least one rule of the plurality of rules being assigned a weight dependent on a category to which the organization belongs.

At a process 806, the computing device (e.g., via keyword engine 304) extracts, based on applying the plurality of rules, multiple collections of keywords. At a process 808, the computing device (e.g., via query engine 306) generate a plurality of search queries, each search query of the plurality of search queries including a different collection of keywords from the multiple collections of keywords. At a process 810, the computing device (e.g., via query engine 306) submits the plurality of search queries to a database. An order in which the search queries are submitted may be based on a weight of the their corresponding rules. At a process 812, the computing device (e.g., via query engine 306) receives multiple result sets from the database in response to the plurality of submitted search queries. At a process 814, the computing device (e.g., via query engine 306) in response to the input question, provide a final result set to the user, the final result set including a subset of documents included in the multiple result sets.

In some embodiments, one or more actions illustrated in processes 802-814 may be performed for any number of input questions received by the CRM system. It is also understood that additional processes may be performed before, during, or after processes 802-814 discussed above. It is also understood that one or more of the processes of method 800 described herein may be omitted, combined, or performed in a different sequence as desired.

Unless specifically stated otherwise as apparent from the following discussion, it is appreciated that throughout the description, discussions utilizing terms such as "determining," "providing," "generating," "comparing," "receiving," "applying," "identifying," "extracting," "submitting," "reducing," "removing," "ranking," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device comprising: a memory containing machine readable medium storing machine executable code; and one or more processors coupled to the memory and configurable to execute the machine executable code to cause the one or more processors to:
    receive an input question from a user, the input question being directed to an organization of a plurality of organizations, and each organization of the plurality of organization belonging to at least one category of a plurality of categories;
    apply a plurality of rules using natural language processing to the input question, at least one rule of the plurality of rules being assigned a weight dependent on a category to which the organization belongs;
    extract, based on applying the plurality of rules, multiple collections of keywords;
    generate a plurality of search queries, each search query of the plurality of search queries including a different collection of keywords from the multiple collections of keywords;
    submit the plurality of search queries to a database, wherein the plurality of search queries are submitted in an order based on the weight of the corresponding rule;
    receive multiple result sets from the database in response to the plurality of submitted search queries; and in response to the input question, provide a final result set to the user, the final result set including a subset of documents included in the multiple result sets.

2. The computing device of claim 1, wherein the machine executable code further causes the one or more processors to:
    receive a second input question directed to a second organization of the plurality of organizations, the second organization belonging to a second category of the plurality of categories; and
    apply a second plurality of rules to the second input question.

3. The computing device of claim 2, wherein the first plurality of rules is the same as the second plurality of rules if the first category is the same as the second category, and the first plurality of rules is different from the second plurality of rules if the first category is different from the second category.

4. The computing device of claim 2, wherein at least one rule of the second plurality of rules is assigned a second weight dependent on the second category.

5. The computing device of claim 1, wherein the multiple collections of keywords includes a first collection of keywords and a second collection of keywords, and wherein the first collection of keywords is different from the second collection of keywords.

6. The computing device of claim 5, wherein a first search query of the plurality of search queries includes the first collection of keywords and a second search query of the plurality of search queries includes the second collection of keywords.

7. The computing device of claim 1, wherein the machine executable code further causes the one or more processors to: submit one or more search queries of the plurality of search queries to the database until a maximum number of documents that are included in the final result set is received.

8. The computing device of claim 1, wherein each rule of the plurality of rules is assigned a weight, and each weight assigned to a rule is based on the category to which the organization belongs.

9. The computing device of claim 1, wherein the machine executable code further causes the one or more processors to:
reduce a number of documents received in the multiple result sets to achieve the final result set.

10. The computing device of claim 1, wherein the machine executable code further causes the one or more processors to:
identify a set of duplicate documents included in the multiple result sets; and
remove at least one duplicate document from the multiple result sets.

11. The computing device of claim 1, wherein the machine executable code further causes the one or more processors to:
rank one or more documents included in the multiple result sets, wherein the rank is independent of the input question.

12. The computing device of claim 1, wherein the machine executable code further causes the one or more processors to: determine whether a total number of documents included in the multiple result sets exceeds a maximum number of documents that are included in the final result set; in response to a determination that the total number of documents included in the multiple result sets exceeds the maximum number of documents that are included in the final result set, remove one or more documents based on the rank of the one or more documents.

13. A method performed by one or more processors executing machine executable code, the method comprising:
receiving an input question from a user, the input question being directed to an organization of a plurality of organizations, and each organization of the plurality of organization belonging to at least one category of a plurality of categories;
applying a plurality of rules using natural language processing to the input question, at least one rule of the plurality of rules being assigned a weight dependent on a category to which the organization belongs;
extracting, based on applying the plurality of rules, multiple collections of keywords;
generating a plurality of search queries, each search query of the plurality of search queries including a different collection of keywords from the multiple collections of keywords;
submitting the plurality of search queries to a database, wherein the plurality of search queries are submitted in an order based on the weight of the corresponding rule;
receiving multiple result sets from the database in response to the plurality of submitted search queries;
and in response to the input question, providing a final result set to the user, the final result set including a subset of documents included in the multiple result sets.

14. The method of claim 13, further comprising: submitting one or more search queries of the plurality of search queries to the database until a maximum number of documents that are included in the final result set is received.

15. The method of claim 13, wherein each rule of the plurality of rules is assigned a weight, and each weight assigned to a rule is based on the category to which the organization belongs.

16. The method of claim 13, further comprising:
ranking one or more documents included in the multiple result sets, wherein the ranking is independent of the input question.

17. The method of claim 16, wherein a document of the one or more document is ranked based on at least one of a last modified date of the document or a length of the document.

18. A non-transitory machine-readable medium comprising executable code which when executed by one or more processors associated with a computing device are adapted to cause the one or more processors to perform a method comprising:
receiving an input question from a user, the input question being directed to an organization of a plurality of organizations, and each organization of the plurality of organization belonging to at least one category of a plurality of categories;
applying a plurality of rules using natural language processing to the input question, at least one rule of the plurality of rules being assigned a weight dependent on a category to which the organization belongs;
extracting, based on applying the plurality of rules, multiple collections of keywords;
generating a plurality of search queries, each search query of the plurality of search queries including a different collection of keywords from the multiple collections of keywords;
submitting the plurality of search queries to a database, wherein the plurality of search queries are submitted in an order based on the weight of the corresponding rule;
receiving multiple result sets from the database in response to the plurality of submitted search queries;
and in response to the input question, providing a final result set to the user, the final result set including a subset of documents included in the multiple result sets.

* * * * *